United States Patent
Brady et al.

(10) Patent No.: US 11,935,028 B1
(45) Date of Patent: Mar. 19, 2024

(54) REAL-TIME ACCOUNT-TO-ACCOUNT PAYMENT

(71) Applicant: United Services Automobile Association (USAA), San Antonio, TX (US)

(72) Inventors: John Weatherman Brady, San Antonio, TX (US); Christopher J. Cox, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 178 days.

(21) Appl. No.: 17/346,484

(22) Filed: Jun. 14, 2021

Related U.S. Application Data

(63) Continuation of application No. 15/837,137, filed on Dec. 11, 2017, now Pat. No. 11,062,291.

(60) Provisional application No. 62/434,835, filed on Dec. 15, 2016.

(51) Int. Cl.
*G06Q 20/00* (2012.01)
*G06Q 20/10* (2012.01)
*G06Q 20/22* (2012.01)
*H04L 67/306* (2022.01)
*H04L 67/55* (2022.01)

(52) U.S. Cl.
CPC .......... *G06Q 20/223* (2013.01); *G06Q 20/10* (2013.01); *H04L 67/306* (2013.01); *H04L 67/55* (2022.05)

(58) Field of Classification Search
CPC ...... G06Q 20/10; G06Q 20/40; G06Q 20/322; G06Q 20/385
See application file for complete search history.

(56) References Cited

U.S. PATENT DOCUMENTS

| | | |
|---|---|---|
| 7,689,508 B2 | 3/2010 | Davis et al. |
| 7,766,223 B1 | 8/2010 | Mello et al. |
| 2017/0076275 A1 | 3/2017 | Mutisya |
| 2017/0103392 A1 | 4/2017 | Moore et al. |
| 2017/0132615 A1 | 5/2017 | Castinado et al. |
| 2017/0364971 A1* | 12/2017 | Lyons ................... G06F 16/951 |

* cited by examiner

*Primary Examiner* — Scott S Trotter
(74) *Attorney, Agent, or Firm* — Fish & Richardson P.C.

(57) ABSTRACT

Implementations of the present disclosure include receiving transaction data for a transaction that is to be executed by a computer-implemented person-to-person (P2P) payment system, the transaction data including a unique account identifier uniquely identifying an account of a first user among a plurality of accounts of the first user, and an amount to be transferred to the account from a second user, processing the transaction data to execute the transaction, and transmitting notifications to each of the first user and the second user, the notifications providing information regarding the transaction.

15 Claims, 3 Drawing Sheets

REAL-TIME ACCOUNT-TO-ACCOUNT PAYMENT

CROSS-REFERENCE TO RELATED APPLICATIONS

This application is a continuation application of and claims priority under 35 U.S.C. § 120 to U.S. application Ser. No. 15/837,137, filed on Dec. 11, 2017, now U.S. Pat. No. 11,062,291, which claims priority to U.S. Provisional Application Ser. No. 62/434,835, filed on Dec. 15, 2016, the entire contents of each of which are incorporated herein by reference.

BACKGROUND

Technological advancement has enabled unconventional payment channels for funds to be transferred between parties. For example, so-called account-to-account payment systems (e.g., person-to-person (P2P) payment systems) have been enabled, some such systems leveraging mobile devices, and mobile applications executed thereon. For example, a P2P payment system enables a party to transfer funds from one account directly into an account of another party based on an identifier, such as an email address or a mobile telephone number.

SUMMARY

This specification relates to enabling users to select an account from a plurality of accounts for execution of a transaction in a computer-implemented account-to-account payment system (also referred to as person-to-person (or peer-to-peer) (P2P) payment system herein).

In general, innovative aspects of the subject matter described in this specification can be embodied in methods that include actions of receiving transaction data for a transaction that is to be executed by a computer-implemented P2P payment system, the transaction data including a first unique account identifier uniquely identifying an account of a first user among a plurality of accounts of the first user, and an amount to be transferred to the account from a second user, processing the transaction data to execute the transaction, and transmitting notifications to each of the first user and the second user, the notifications providing information regarding the transaction. Other implementations of this aspect include corresponding systems, apparatus, and computer programs, configured to perform the actions of the methods, encoded on computer storage devices.

These and other implementations can each optionally include one or more of the following features: the first unique account identifier includes an electronic message address that is unique within electronic message addresses assigned to each account in the plurality of accounts; at least one notification includes an electronic message that is transmitted to the first unique account identifier; the first unique identifier is assigned to the account by a financial institution holding the account; the first unique identifier includes a hash value, and processing the transaction data includes validating the transaction at least partly based on the hash value; the transaction data further includes a second unique account identifier uniquely identifying an account of the second user among a plurality of accounts of the second user; and the transaction data is provided by the second user using a mobile application of the P2P system executing on a computing device of the second user.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Implementations of the present disclosure are generally directed to enabling users to select an account from a plurality of accounts for execution of a transaction in a computer-implemented account-to-account payment system (also referred to as person-to-person (or peer-to-peer) (P2P) payment system herein). More particularly, implementations of the present disclosure enable an enterprise (e.g., financial institution), with which a user has multiple accounts (e.g., savings, checking), to assign a unique identifier to each account of the multiple accounts. As described in further detail herein, the user can execute transactions in a computer-implemented P2P payment system using one or more of the multiple accounts. In some implementations, actions include receiving transaction data for a transaction that is to be executed by a computer-implemented P2P payment system, the transaction data including a unique account identifier uniquely identifying an account of a first user among a plurality of accounts of the first user, and an amount to be transferred to the account from a second user, processing the transaction data to execute the transaction, and transmitting notifications to each of the first user and the second user, the notifications providing information regarding the transaction.

Figure 1:
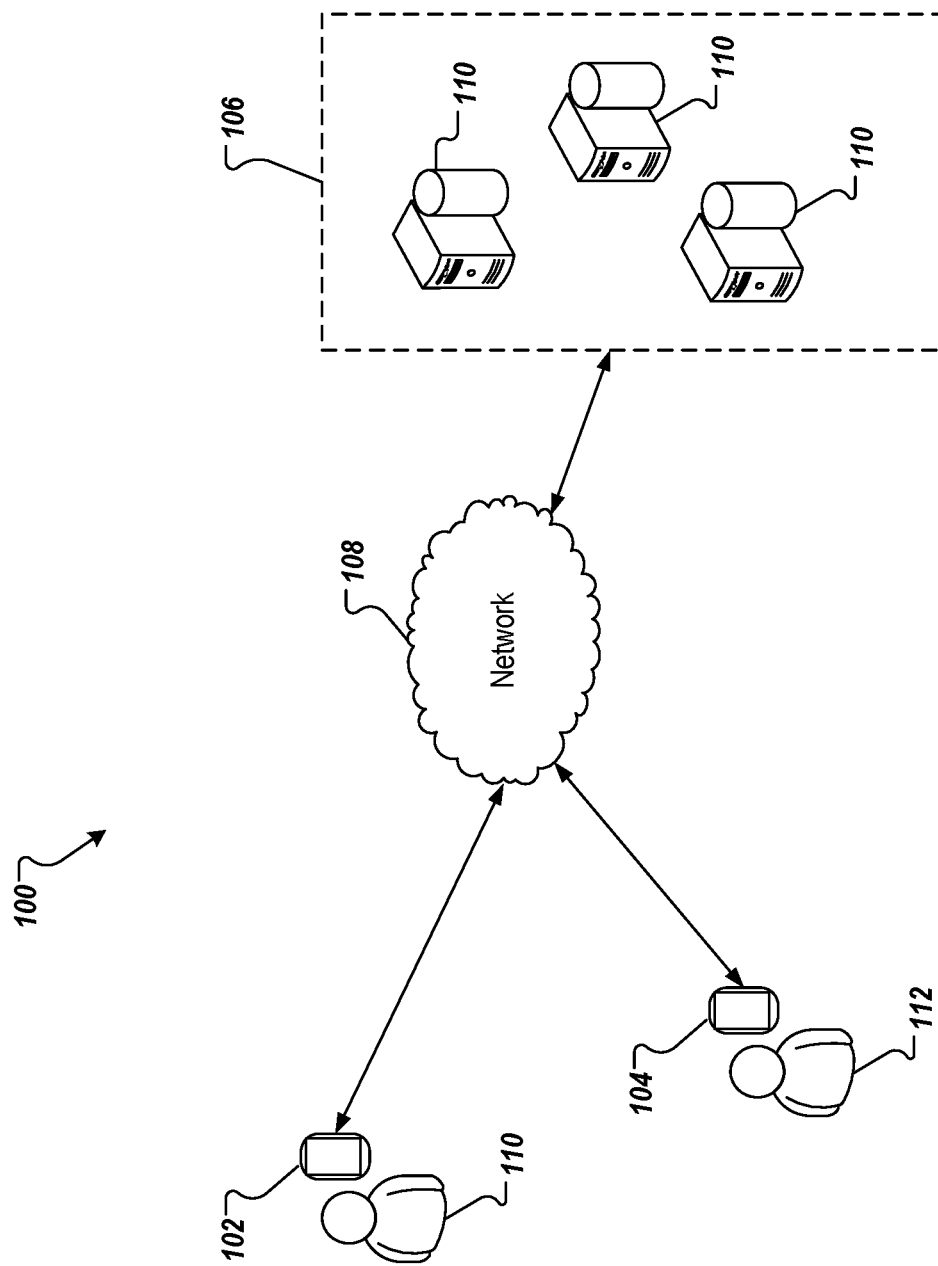
FIG. 1 depicts an example environment that can be used to execute implementations of the present disclosure.

FIG. 1 depicts an example environment 100 that can be used to execute implementations of the present disclosure. In some examples, the example environment 100 enables users to transfer funds between accounts using computing devices in a computer-implemented account-to-account payment system. The example environment 100 includes computing devices 102, 104, a back-end system 106, and a network 108. In some examples, the computing devices 102, 104 are used by respective users 110, 112 to log into and interact with the back-end system 106 over the network 108.

In the depicted example, the computing devices 102, 104 are provided as mobile computing devices. It is contemplated, however, that implementations of the present disclosure can be realized with any appropriate computing device (e.g., smartphone, tablet, laptop computer, voice enabled devices). In some examples, the network 108 includes a local area network (LAN), wide area network (WAN), the Internet, or a combination thereof, and connects web sites, user devices (e.g., computing devices 102, 104), and the back-end systems (e.g., back-end system 106). In some examples, the network 108 can be accessed over a wired and/or a wireless communications link. For example, mobile computing devices, such as smartphones can utilize a cellular network to access the network 108.

In the depicted example, the back-end system 106 includes at least one server system 120. In some examples, the at least one server system 120 hosts one or more computer-implemented services that users can interact with using computing devices. For example, the computing devices 102, 104 can be used to communicate with a service hosted by the back-end system 106 over the network 108. In some examples, the computing devices 102, 104 each includes a computer-executable application executed thereon, which can be used to log into the service and establish a communication session between the computing device 102, 104 and the back-end system 106. In some examples, the computing devices 102, 104 each includes a web browser application executed thereon, which can be used to display one or more web pages of the service, the user interacting with the service through the web page(s).

In the context of the present disclosure, a service includes a P2P payment system. In some examples, the P2P payment system leverages mobile applications to enable users to directly transfer funds to each other's accounts (e.g. checking, savings). Example P2P payment systems include, without limitation, Venmo, Snapcash, Square Cash, Zelle, and clearXchange. In some examples, a P2P payment system enables a user to send funds to another user. Generally, the users do not need to know the details of each other's accounts. Instead, a P2P payment system typically only requires users to know each other's unique user identifiers (e.g., email addresses, phone numbers).

In the example of FIG. 1, the P2P payment system can be hosted on one or more server systems of the back-end system 106, and can be accessed by the users 110, 112 using the respective computing devices 102, 204. In some implementations, each user 110, 112 can establish a user profile to access the P2P payment system hosted by a back-end system 104. In some examples, the user profile includes user-specific information. Example user-specific information can include, without limitation, username, password, email address, mobile telephone number, and account information (e.g., specifying an account to/from which funds can be transferred using the P2P payment system).

To provide context for implementations of the present disclosure, computer-implemented P2P payment systems, enable users to execute real-time money transfers between respective accounts. In some examples, the user's account is associated with an identifier that is unique to the user (e.g., a unique user identifier). Example unique user identifiers include, without limitation, an email address, and a mobile telephone number. Within a traditional computer implemented account to account payment system, the accounts are identified by a unique institution identifier tied to the financial institution in addition to a unique account identifier (e.g., account number) tied to the account. For one user to send a payment to the another user, an account to account payment system would require at least one of the users to know the details of the institution identifier and account identifier for the other user.

In a traditional computer-implemented P2P payment system, an example transaction can include a first user transferring money to a second user. In some examples, the first user accesses an application executed on a computing device (e.g., a mobile app executing on a smartphone) to conduct the transfer. In some examples, the first user is associated with a first unique user identifier within the application. For example, when setting up a profile for using the application, the first user provides the first unique identifier (e.g., an email address, a username, a mobile number), and an account (e.g., checking account, savings account), to which the first user identifier is linked. The first user inputs an amount, and a unique user identifier associated with a payee. In the instant example, the first user inputs a second unique user identifier, which is associated with the second user, and is linked to an account (e.g., checking account, savings account) of the second user. The first user executes the transaction, and the funds are transferred from the account linked to the first unique user identifier to the account linked with the second unique user identifier.

However, the unique user identifier in a traditional computer-implemented account-to-account payment system is linked to a single account. In this manner, it is predetermined, and somewhat fixed as to which account the funds are to be transferred to/from. Consequently, if, instead of a first account, a user would like to transfer funds to/from a second account, the user's unique user identifier would need to be unlinked from the first account, and linked to the second account before conducting the transaction.

In accordance with implementations of the present disclosure, a computer-implemented P2P payment system enables users to select an account from a plurality of accounts for execution of a transaction. More specifically, each account of the plurality of accounts is associated with a respective unique account identifier. Implementations of the present disclosure are described in further detail herein with reference to an example unique account identifier, an electronic message address (e.g., email address). It is contemplated, however, that any appropriate unique account identifier can be used with implementations of the present disclosure. When executing a transaction, a user uses the unique address identifier associated with the account of the plurality of accounts to/from which funds are to be transferred.

In contrast to the unique user identifier discussed above with reference to traditional P2P payment systems, the unique account identifier uniquely identifies an account, as opposed to uniquely identifying a user. In accordance with implementations of the present disclosure, multiple unique account identifiers can be associated with a user (e.g., linked to a unique user identifier of the user) to enable the user to use a P2P payment system to transfer funds to/from multiple accounts.

In some implementations, a financial institution holds the accounts of a user. Example accounts held by financial institutions can include, without limitation, checking accounts, savings accounts, investment accounts, retirement accounts, and the like. In accordance with implementations of the present disclosure, the financial institution can issue a unique account identifier for each account. An example, fictional user, John Q. Customer, can have a first checking account (CK1), a second checking account (CK2), and a first savings account (SV1) with an example, fictional financial institution, Acme Bank. The financial institution can assign a unique account identifier to each of the accounts. For example, and the example context of electronic message addresses:

First Checking Account (CK1)→john.q.customer.ck1@acmebank.com
Second Checking Account (CK2)→john.q.customer.ck2@acmebank.com
First Savings Account (SV1)→john.q.customensv1@acmebank.com In the provided example, each unique account identifier is provided in the example format of customer name (e.g., firstname.initial.lastname), account reference (e.g., CK1, CK2, SV1), and domain of the financial institution (e.g., @domain). For example, the account reference is provided as a suffix to the customer name. In some examples, the account reference can be provided as a prefix to the customer name. It is contemplated, however, that any appropriate format can be used to provide a unique account identifier for each account.

In some examples, the account reference can be provided as a unique checksum value. For example, for each account, a cryptographic checksum is generated using a hash function (e.g., SHA-256). In some examples, the checksum value can be used to evaluate an integrity of a transfer of funds to/from an account. For example, in response to a request to transfer funds, a back-end computing device (e.g., a server system 110) can determine a checksum value for each of one or more accounts involved in the transaction, and can compare the checksum value(s) to respective stored checksum value(s) (e.g., stored at the time the unique checksum value was generated as a respective account identifier). The integrity of the transaction with respect to a particular account is verified only, if the two checksum values match. The integrity is verified in that it is determined that the unique account identifier has not been tampered with, and is the same as originally issued by the financial institution. The integrity of the transaction can be determined to be compromised, if the two checksum values do not match. In some examples, if the integrity of the transaction is determined to be compromised, the transaction is prohibited (e.g., by the P2P payment system, by the financial institution(s) involved in the transaction).

In some implementations, the user can establish a profile with a P2P payment system, as introduced above. For example, the user can establish an account with the P2P payment system, and can provide credentials for the account (e.g., username, password, biometric data). In some examples, the credentials are used by the user to log into the P2P payment system, and access their account. In some examples, the user provides information for two or more accounts held at one or more enterprises (e.g., financial institutions) for use in funds transfers.

In some implementations, the account information can include the unique account identifier assigned to the respective accounts. In some examples, the P2P payment system can transmit a message to each of the accounts based on the respective unique account identifiers as part of an authentication and/or account set-up protocol. For example, the unique account identifiers can be provided as electronic message addresses, and the P2P payment system can send electronic messages to each of the electronic message addresses. In some examples, each electronic message provides a confirmation that the respective account is being used by the user to affect funds transfers through the P2P payment system. For example, the electronic message can include a hyperlink that the user clicks on to confirm, and have completion of the account set-up performed. User access to such electronic messages is described in further detail herein with reference to respective inboxes that can be established for each account.

Figure 2:
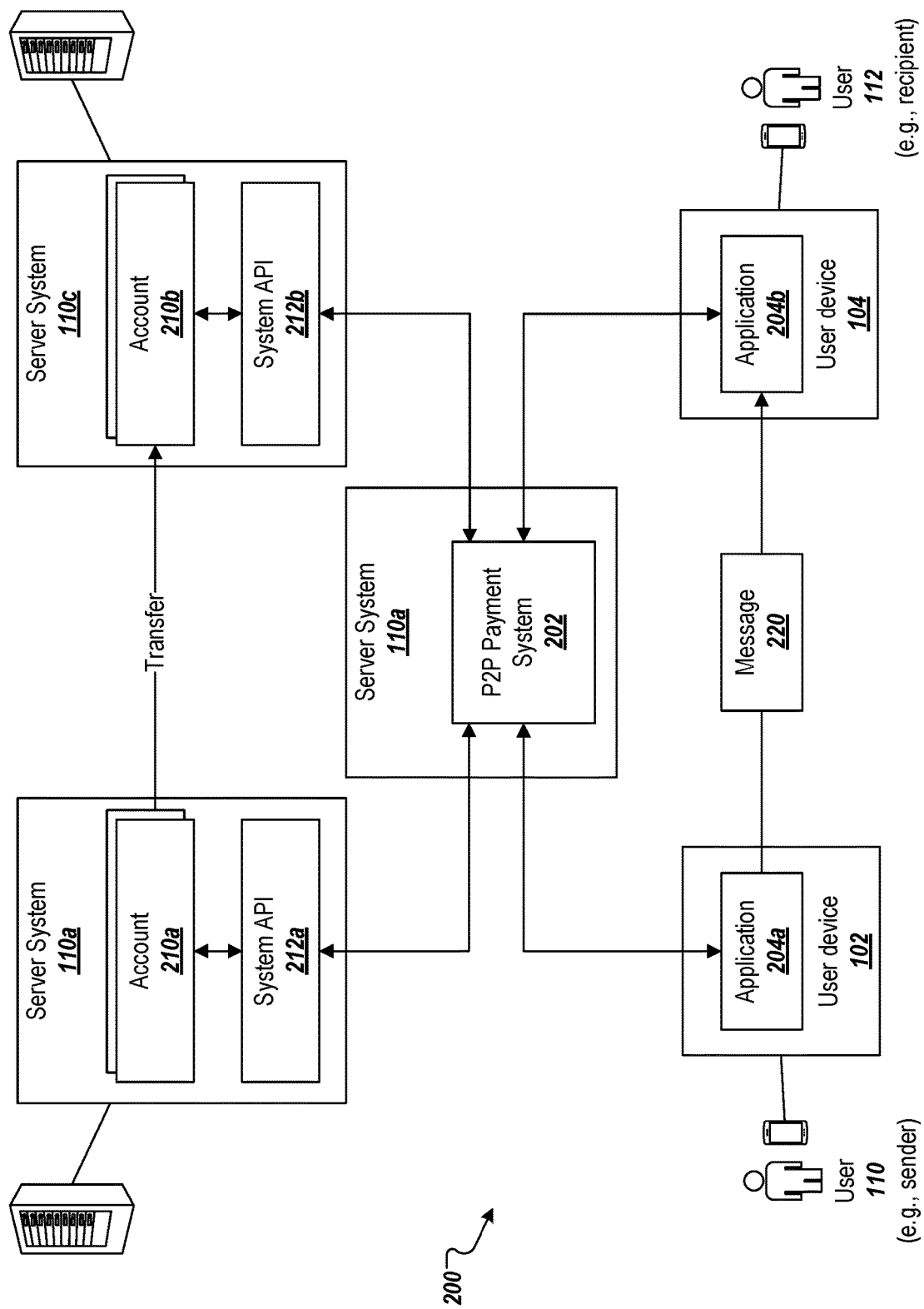
FIG. 2 depicts an example system for transferring funds between accounts in accordance with implementations of the present disclosure.

FIG. 2 depicts an example system for transferring funds between accounts in accordance with implementations of the present disclosure. The devices and software modules depicted in FIG. 2 can communicate with one another over one or more networks (e.g., the network 108 of FIG. 1), including wired and/or wireless network(s) of any type that support any communication protocol(s). Such communications may be encrypted or otherwise secured to prevent unauthorized access to the communicated information.

In the example of FIG. 2, the user 110 (e.g., as sender) may request to transfer funds to the user 112 (e.g., as recipient). In some examples, a computer-implemented P2P payment system 202 provides a P2P payment service, which the users 110, 112 use to execute the fund transfer. For example, the respective computing devices 102, 104 execute respective applications 204a, 204b (e.g., mobile apps), which enable communication with the P2P payment system 202. The applications 204a, 204b can be collectively referenced as the application 204. In some examples, the application 204 can be digital wallets, or may access digital wallets, and/or can be payment system —specific mobile applications (e.g., downloaded and installed from an application store (app store)) executing on the computing devices 102, 104 respectively. In some examples, the application 204 enable the sender and/or recipient to enter account information such as an account number and routing transit number for an account at a bank or other institution.

In some implementations, the P2P payment system 202, and the application 204 can be provided by an enterprise (e.g., financial institution) holding accounts of the sender and/or recipient. In some implementations, the P2P payment system, and the application 204 can be provided by a third-party service provider. In the depicted example, the P2P payment system 202 is hosted on a server system 110a, which can be owned and/or operated by or on behalf of the enterprise, or the third-party.

In some examples, the account information for the sender and/or the recipient may be communicated from the computing device(s) 102, 104 to the P2P payment system 202. The account information for the sender may be communicated in a sender token from the computing device 102 to the P2P payment system 202, and the account information for the recipient may be communicated in a recipient token from the user computing 104 to the P2P payment system 202. The account information for the sender and/or recipient may be stored (e.g., as tokens) by the P2P payment system 202, and accessed to facilitate funds transfers between the parties.

In some examples, the account information for the sender may describe multiple accounts 210a (e.g., one or more savings accounts, one or more checking accounts) managed by a server system 110b for a first enterprise (e.g., financial institution). In some examples, the account information for the recipient can describe multiple accounts 210b managed by a server system 110c for a second institution (e.g., financial institution). Although examples herein may describe the sender and recipient as having accounts managed by different institutions, in some examples the sender and recipient may have accounts at the same institution.

As described above, the sender and/or recipient may be authenticated to access features and/or information provided by the application 204. Authentication may include verifying credentials provided by the sender and/or recipient, verifying user identity through biometric authentication methods, and/or other forms of authentication.

The sender may use the application 204a to request a transfer of funds to the recipient. The sender may enter, through the application 204a, an amount to transfer (e.g., $50), one or more account identifiers, from which the funds are to be transferred, and one or more account identifiers of the recipient, to which the funds are to be transferred. With respect to the sender, for example, the sender may desire that the funds be transferred from a specific account of multiple accounts. Consequently, the sender enters the unique account identifier assigned to the specific account (e.g., john.q.sender.ck1@acmebank.com). As another example, the sender may desire that the funds transfer be split between two or more accounts of the multiple accounts. Consequently, the sender enters unique account identifiers associated with the two or more accounts, and respective amounts to be transferred from each of the two or more accounts (e.g., [$20, john.q.sender.ck1@acmebank.com], [$30, john.q.sender.sv1@acmebank.com]).

With respect to the recipient, for example, the recipient may desire that the funds be transferred into a specific account of multiple accounts. Consequently, the sender enters the unique account identifier assigned to the specific account (e.g., john.q.recipient.ck2@acmebank.com). As another example, the recipient may desire that the funds be split between two or more accounts of the multiple accounts. Consequently, the sender enters unique account identifiers associated with the two or more accounts, and respective amounts to be transferred to each of the two or more accounts (e.g., [$10, john.q.recipient.ck2@acmebank.com], [$40, john.q.recipient.sv1@acmebank.com]).

In response to the request, the application 204a may send a message 220 that may be received at the computing device 104, and accessed by the recipient using the application 204b. On receiving the message 220, the recipient may indicate, through the application 204b, whether the funds transfer is to be allowed or disallowed. The application 204b may communicate this decision to the P2P payment system 202. Although, in the example of FIG. 2, the message 220 is depicted as directly communicated from the computing device 102 to the computing device 104, it is contemplated that any appropriate channel of communication can be used. For example, the message 220 can be transmitted through the network 108, and/or the P2P payment system 202. If the funds transfer is approved, the P2P payment system 202 initiates the funds transfer from the one or more accounts 210a to the one or more accounts 210b.

Implementations of the present disclosure support a variety of mechanisms for the funds transfer. In some implementations, the funds transfer employs a mechanism (e.g., a rail) that is independent of, and/or separate from, any credit card network. In the example of FIG. 2, the funds transfer may be a (e.g., direct) transfer between the accounts 210a, 210b using a mechanism such as that provided by the Automated Clearing House (ACH). In some examples, the mechanism for transfer may be a commercial P2P network, such as clearXchange, for example, or other(s), which provide real time notification of the funds being transferred with an ACH settlement. In some examples, the mechanism for transfer may be a (e.g., closed) bilateral network between the institutions. The P2P payment system 202 may access the account information for the sender and recipient, and request that the server system 110a initiate a transfer of funds from the account(s) 210a (e.g., having respective account number(s), and routing transit number(s)) to the account(s) 210b (e.g., having respective account number(s), and routing transit number(s)). In some implementations, the P2P payment system 202 may send a notification to the applications 204 to notify the sender and recipient that the funds transfer has been performed.

In some implementations, the P2P payment system 202 can communicate with the server systems 110 through respective application protocol interfaces (APIs) 212a, 212b executing on the server systems 110b, 110c. In some examples, the APIs 212a, 212b can provide RESTful endpoints that enable communications between their respective server systems 110, and other systems such as the P2P payment system 202.

In some implementations, the P2P payment system 202 may itself provide a mechanism or rail for funds transfer instead of employing a third party mechanism, such as ACH. For example, the P2P payment system 202 may employ holding accounts to perform the transfer. In some examples, a first holding account can be associated with the first institution (e.g., of the sender), and a second holding account may be associated with the second institution (e.g., of the recipient). On receiving approval of the funds transfer from the recipient, the P2P payment system 202 can debit the first holding account the transferred amount, and credit the second holding account the transferred amount. The P2P payment system 202, and/or API(s) can later perform settlement operations to debit and credit the appropriate accounts.

In accordance with implementations of the presents disclosure, the respective unique account identifiers can be used for recordkeeping and/or reconciliation of the respective accounts. For example, and as introduced above, the unique account identifiers can be provided as electronic message addresses (e.g., email addresses). Consequently, for each account, an inbox can be provided, which can be used to send/receive messages associated with the respective accounts. For example, a sender can send funds from multiple accounts in a transaction. Multiple transaction receipts can be provided, a transaction receipt for each account, and can be sent to the inboxes of the respective accounts as electronic messages using the respective electronic message addresses. In some examples, the user can log into a web site of the enterprise, for example, to review account details, and can access the inboxes of the respective accounts.

To highlight efficiencies achieved by implementations of the present disclosure, an example, non-limiting use case is described. The example use case includes a first user transferring funds to a second user, the first user owing the second user funds for both a personal debt, and a business debt. The first user will pay the debts using a P2P payment system, as described herein, and will pay the business debt from a business checking account, and the personal debt from a personal checking account the first user holds at a first financial institution. The second user requests payment for the business debt to a business checking account the second user holds at a second financial institution, and the personal debt to a personal savings account the second user holds at a third financial institution.

The first user access a mobile app using a smartphone, the mobile app enabling the first user to execute a transaction through the P2P payment system. The first user inputs details of the transaction including an amount of the business debt, the unique identifier assigned to the second user's business checking account, and the unique account identifier assigned to the first user's business checking account, as well as an amount of the personal debt, the unique account identifier assigned to the second user's personal savings account, and the unique account identifier assigned to the first user's personal checking account. The first user submits the transaction to the P2P payment system, which executes the transaction as instructed.

The example use case highlights particular efficiencies achieved by implementations of the present disclosure. For example, multiple payments can be made to/from multiple accounts with a single transaction. In this manner, multiple transactions are not required, which conserves technical resources of the smartphone and back-end server systems that execute transactions, as well as conserving network bandwidth (e.g., fewer transactions results in a reduced load on devices, servers, and networks). Further, a user need not establish multiple user accounts with the P2P payment system (e.g., a personal user account linked to a personal financial account, and a business user account linked to a business financial account). In this manner, the technological resources used to store and maintain accounts are conserved.

Figure 3:
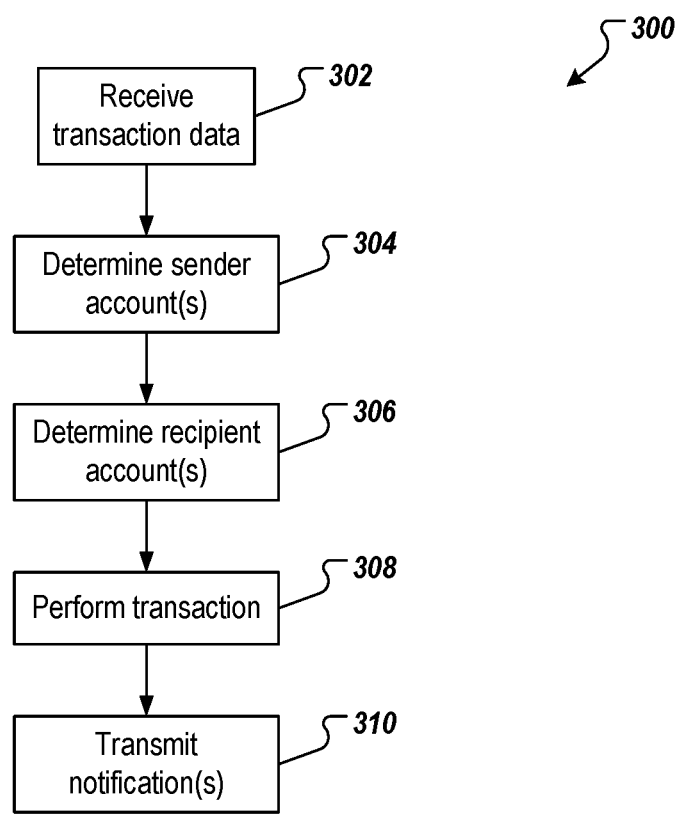
FIG. 3 depicts an example process that can be executed in accordance with implementations of the present disclosure.

FIG. 3 depicts an example process 300 that can be executed in accordance with implementations of the present disclosure. The example process 300 can be provided by one or more computer-executable programs executed by one or more computing devices. The examples process 300 can be executed to conduct transactions using a P2P payment system in accordance with implementations of the present disclosure.

Transaction data is received (302). For example, the P2P payment system 202 of FIG. 2 receives transaction data. In some examples, the transaction data is representative of a transaction that is to be executed by the P2P payment system. In some examples, the transaction data includes a first unique account identifier uniquely identifying an account of a first user among a plurality of accounts of the first user, and an amount to be transferred to the account from a second user. In some examples, the first unique account identifier includes an electronic message address that is unique within electronic message addresses assigned to each account in the plurality of accounts. In some examples, the first unique identifier is assigned to the account by a financial institution holding the account. In some examples, the first unique identifier includes a hash value. In some examples, the transaction data also includes a second unique account identifier uniquely identifying an account of the second user among a plurality of accounts of the second user. In some examples, the transaction data is provided by the second user using a mobile application of the P2P system executing on a computing device of the second user.

One or more sender accounts are determined (304). For example, the P2P payment system can process the transaction data to identify one or more accounts of a sender (e.g., second user), from which payment(s) is to be transferred. In some examples, each of the one or more accounts is identified based on respective unique identifiers associated with the accounts. One or more recipient accounts are determined (306). For example, the P2P payment system can process the transaction data to identify one or more accounts of a recipient (e.g., first user), to which payment(s) is to be transferred. In some examples, each of the one or more accounts is identified based on respective unique identifiers associated with the accounts.

The transaction is performed (308). In some examples, the P2P payment system processes the transaction data to execute the transaction. In some examples, processing the transaction data includes validating the transaction at least partly based on the hash value, in cases where hash values are included in respective unique account identifiers. One or more notifications are transmitted (310). For example, the P2P payment system can transmit electronic messages based on the unique account identifiers (e.g., emails mailed to the unique account identifier) to the sender and/or recipient. In some examples notifications can be transmitted based on unique user identifiers (e.g., user email address, user telephone number. For example, the sender and/or recipient can receive a text message or email providing details of the transaction.

Implementations of the present disclosure provide one or more advantages over conventional, computer-implemented P2P payment systems. For example, implementations of the present disclosure enable senders and/or recipients to split respective portions of a funds transfer between multiple accounts. Not only is this a convenience for users, but also provides efficiencies in the underlying technologies. For example, a user can have a single user account with the P2P payment system that can be used to affect fund transfers from multiple financial accounts (e.g., a business checking account, a personal checking account). Consequently, implementations of the present disclosure absolve the need for a user to establish multiple user accounts with the P2P payment system (e.g., a first user account linked to a business checking account, and a second user account linked to a personal checking account). In this manner, technological resources are conserved, because the P2P payment system does not need to store and/or process information for multiple accounts. Further, bandwidth (e.g., network, server) is conserved, because the user does not need to log into multiple accounts for different types of transactions (e.g., business, personal).

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer can include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementation of the present disclosure or of what may be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving, by at least one processor, first transaction data for a plurality of first transactions for execution by a computer-implemented payment system, the first transaction data comprising, for each of the first transactions:
      a first account identifier comprising a first e-mail address uniquely identifying a first financial account of a first user among a plurality of financial accounts of the first user, wherein the first e-mail address is generated by a first financial institution holding the first financial account, wherein the first e-mail address is associated with a first e-mail inbox that is specific to the first financial account, wherein the first e-mail address comprises a first portion comprising a checksum value indicating the first financial account, and wherein the checksum value is generated using a hash function, and
      a respective amount of funds to be transferred between the first financial account and a respective additional financial account of a respective additional user;
   processing, by the at least one processor, the first transaction data to execute the plurality of first transactions; and
   transmitting, by the at least one processor, one or more first notifications regarding the plurality of first transactions to the first e-mail inbox using the first e-mail address.

2. The method of claim 1, wherein the first e-mail address further comprises:
   a second portion indicating a name of the user, and
   a third portion indicating the first financial institution.

3. The method of claim 1, wherein at least one of the first transactions comprises a transfer of a respective amount of funds from the first financial account of the first user to a respective additional financial account of a respective additional user.

4. The method of claim 1, wherein at least one of the transactions comprises a transfer of a respective amount of funds from a respective additional financial account of a respective additional user to the first financial account of the first user.

5. The method of claim 1, further comprising:
   receiving, by the at least one processor, second transaction data for a plurality of second transactions for execution by the computer-implemented payment system, the second transaction data comprising, for each of the second transactions:
      a second account identifier comprising a second e-mail address uniquely identifying a second financial account of the first user among the plurality of financial accounts of the first user, wherein the second e-mail address is generated by a second financial institution holding the second financial account, and wherein the second e-mail address is associated with a second e-mail inbox that is specific to the second financial account, and
      a respective amount of funds to be transferred between the second financial account and a respective additional financial account of a respective additional user;
   processing, by the at least one processor, the second transaction data to execute the plurality of second transactions; and
   transmitting, by the at least one processor, one or more second notifications regarding the plurality of second transactions to the second e-mail inbox using the second e-mail address.

6. A system comprising:
   one or more processors; and
   one or more computer-readable storage media coupled to the one or more processors and having instructions stored thereon which, when executed by the one or more processors, cause the one or more processors to perform operations comprising:
      receiving first transaction data for a plurality of first transactions for execution by a computer-implemented payment system, the first transaction data comprising, for each of the first transactions:
         a first account identifier comprising a first e-mail address uniquely identifying a first financial account of a first user among a plurality of financial accounts of the first user, wherein the first e-mail address is generated by a first financial institution holding the first financial account, wherein the first e-mail address is associated with a first e-mail inbox that is specific to the first financial account, wherein the first e-mail address comprises a first portion comprising a checksum value indicating the first financial account, and wherein the checksum value is generated using a hash function and
         a respective amount of funds to be transferred between the first financial account and a respective additional financial account of a respective additional user;
      processing the first transaction data to execute the plurality of first transactions; and
      transmitting one or more first notifications regarding the plurality of first transactions to the first e-mail inbox using the first e-mail address.

7. The system of claim 6, wherein the first e-mail address further comprises:
   a second portion indicating a name of the user, and
   a third portion indicating the first financial institution.

8. The system of claim 6, wherein at least one of the first transactions comprises a transfer of a respective amount of funds from the first financial account of the first user to a respective additional financial account of a respective additional user.

9. The system of claim 6, wherein at least one of the transactions comprises a transfer of a respective amount of funds from a respective additional financial account of a respective additional user to the first financial account of the first user.

10. The system of claim 6, the operations further comprising:
    receiving, by the one or more processors, second transaction data for a plurality of second transactions for execution by the computer-implemented payment system, the second transaction data comprising, for each of the second transactions:
       a second account identifier comprising a second e-mail address uniquely identifying a second financial account of the first user among the plurality of financial accounts of the first user, wherein the second e-mail address is generated by a second financial institution holding the second financial account, and wherein the second e-mail address is associated with a second e-mail inbox that is specific to the second financial account, and a respective amount of funds to be transferred between the second financial account and a respective additional financial account of a respective additional user;

processing, by the one or more processors, the second transaction data to execute the plurality of second transactions; and transmitting, by one or more processors, one or more second notifications regarding the plurality of second transactions to the second e-mail inbox using the second e-mail address.

11. One or more non-transitory computer-readable storage media coupled to one or more processors and having instructions stored thereon which, when executed by the one or more processors, cause the one or more processors to perform operations comprising:

receiving first transaction data for a plurality of first transactions for execution by a computer-implemented payment system, the first transaction data comprising, for each of the first transactions:

a first account identifier comprising a first e-mail address uniquely identifying a first financial account of a first user among a plurality of financial accounts of the first user, wherein the first e-mail address is generated by a first financial institution holding the first financial account, wherein the first e-mail address is associated with a first e-mail inbox that is specific to the first financial account, wherein the first e-mail address comprises a first portion comprising a checksum value indicating the first financial account, and wherein the checksum value is generated using a hash function, and a respective amount of funds to be transferred between the first financial account and a respective additional financial account of a respective additional user;

processing the first transaction data to execute the plurality of first transactions; and transmitting one or more first notifications regarding the plurality of first transactions to the first e-mail inbox using the first e-mail address.

12. The one or more non-transitory computer-readable storage media of claim 11, wherein the first e-mail address further comprises:

a second portion indicating a name of the user, and
a third portion indicating the first financial institution.

13. The one or more non-transitory computer-readable storage media of claim 11, wherein at least one of the first transactions comprises a transfer of a respective amount of funds from the first financial account of the first user to a respective additional financial account of a respective additional user.

14. The one or more non-transitory computer-readable storage media of claim 11, wherein at least one of the transactions comprises a transfer of a respective amount of funds from a respective additional financial account of a respective additional user to the first financial account of the first user.

15. The one or more non-transitory computer-readable storage media of claim 11, the operations further comprising:

receiving, by the one or more processors, second transaction data for a plurality of second transactions for execution by the computer-implemented payment system, the second transaction data comprising, for each of the second transactions:

a second account identifier comprising a second e-mail address uniquely identifying a second financial account of the first user among the plurality of financial accounts of the first user, wherein the second e-mail address is generated by a second financial institution holding the second financial account, and wherein the second e-mail address is associated with a second e-mail inbox that is specific to the second financial account, and a respective amount of funds to be transferred between the second financial account and a respective additional financial account of a respective additional user;

processing, by the one or more processors, the second transaction data to execute the plurality of second transactions; and transmitting, by the one or more processors, one or more second notifications regarding the plurality of second transactions to the second e-mail inbox using the second e-mail address.

* * * * *